April 1, 1958
T. A. WETZEL
2,828,674
TRACER MECHANISM STYLUS
Filed April 12, 1956
2 Sheets-Sheet 1
Fig. 1
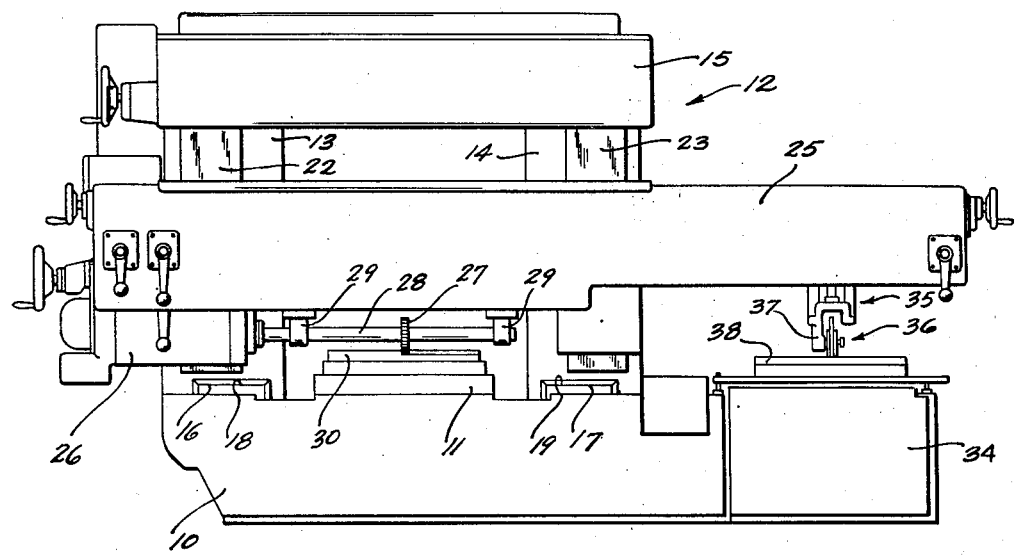
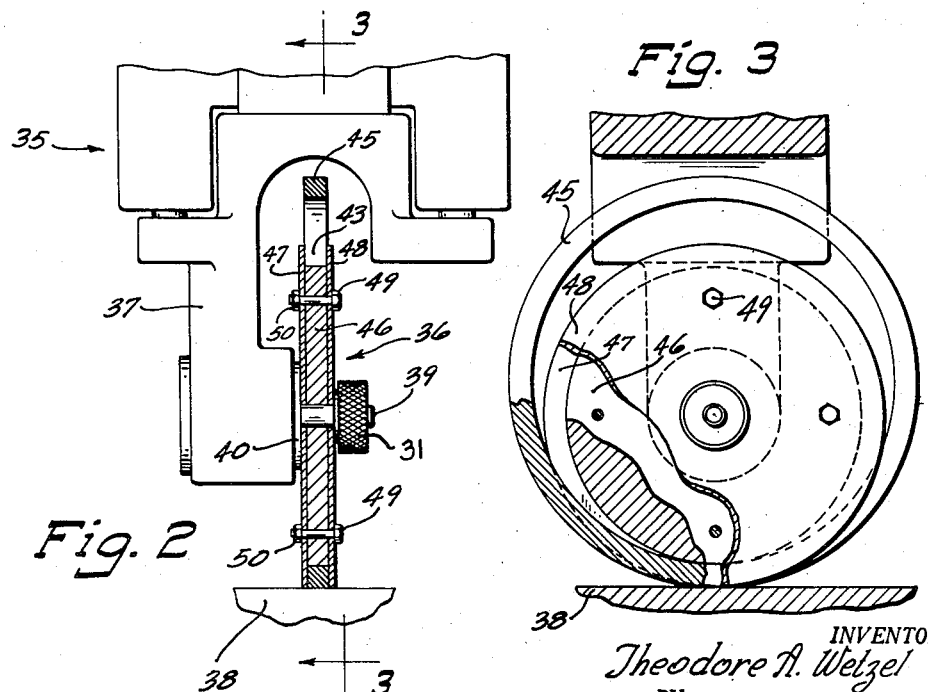
Fig. 2
Fig. 3
INVENTOR.
Theodore A. Wetzel
BY
Elroy J. Wirtschel
Attorney

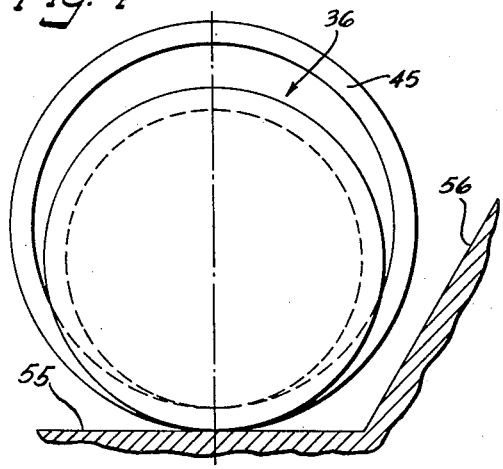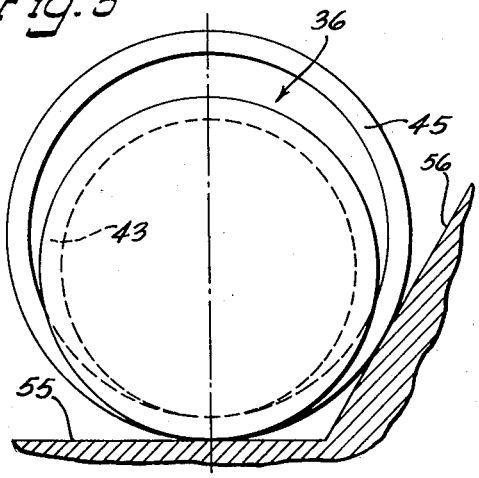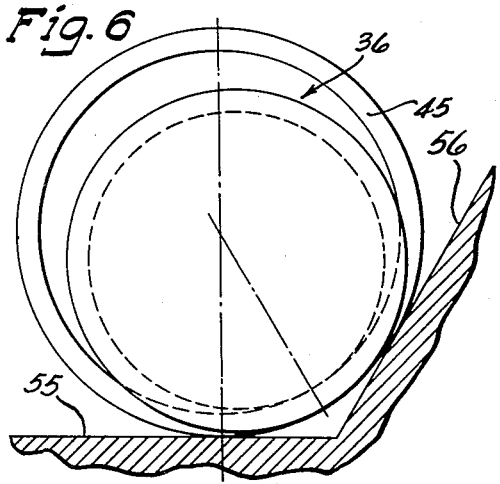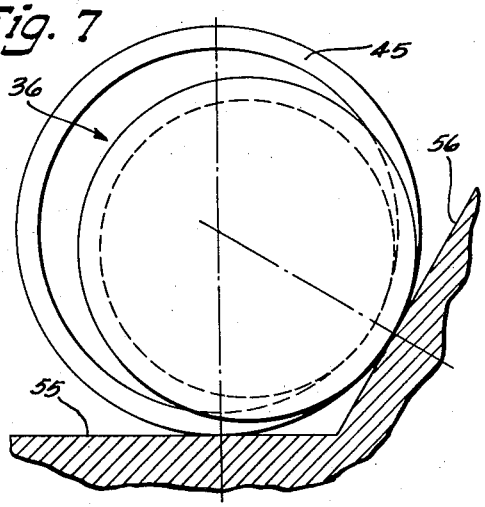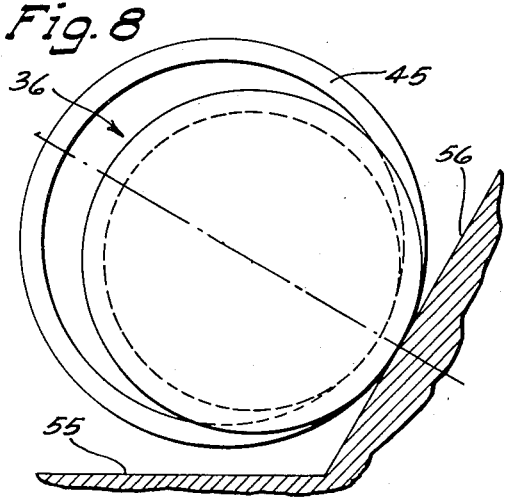

United States Patent Office 2,828,674
Patented Apr. 1, 1958

2,828,674

TRACER MECHANISM STYLUS

Theodore A. Wetzel, Brookfield, Wis., assignor to Kearney & Trecker Corporation, West Allis, Wis., a corporation of Wisconsin Application April 12, 1956, Serial No. 577,735

6 Claims. (Cl. 90—62)

This invention relates generally to a tracer mechanism stylus and more particularly to an improved stylus of the type employed in conjunction with a machine tool to contact the profile of a pattern for the purpose of producing control signals in response to the profile of the pattern which function to control the operation of the machine so that the pattern is reproduced in a workpiece.

Automatic reproducing machines are generally provided with a stylus which engages a pattern and is caused to traverse the profile of the pattern that is to be reproduced. As the stylus traverses the pattern it is deflected by departures in the profile of the pattern and these deflections are utilized for producing control signals which control the operation of the machine so that the pattern is reproduced in a workpiece. It can be appreciated that a certain time lag exists between the instant that the tracer stylus is deflected by the pattern and the instant that the machine responds to such deflection to change the path of movement of the cutter relative to the workpiece to accommodate the departure in the surface of the pattern which caused the deflection of the stylus. Such time lag causes overtravel of the cutter and results in an inaccurate reproduction since the initial departure in the surface of the workpiece does not occur at the same point that the corresponding departure exists in the surface of the pattern. The overtravel of the cutter at outside corners is not serious inasmuch as it only causes a small amount of additional material to remain upon the workpiece, and this excess material may be easily removed by filing or other material removing process. However, at inside corners such overtravel of the cutter is highly objectionable because it removes material from the workpiece which is not supposed to be removed, resulting in damage to the workpiece which cannot be conveniently remedied and it may also damage the cutter. For these reasons it is important that overtravel of the cutter be avoided when it is traversing an inside corner.

It it therefore a general object of the present invention to provide an improved machine tool tracer mechanism stylus that will prevent overtravel of the controlled cutter at inside corners.

Another object of the present invention is to provide an improved tracer mechanism stylus which will operate to anticipate inside corners in a pattern by producing a control signal indicating the occurrence of an inside corner in the pattern an instant before the controlled cutter arrives at the corresponding point in the workpiece.

Another object is to provide an improved anticipator ring for a tracer mechanism stylus that will present a smooth radius at inside corners of the pattern to establish the path of travel of the stylus in lieu of the abrupt corner of the pattern for the purpose of avoiding overtravel of the cutter relative to the workpiece.

Another object is to provide an improved tracer mechanism stylus that operates to anticipate inside corners in a pattern to compensate for the time lag which exists in the response of the machine to a deflection of the stylus when arriving at a departure in the surface of the pattern.

Another object is to provide a tracer mechanism stylus for reproducing machines which is especially adapted to improve the accuracy of the reproduction produced by the machine from a pattern.

A further object is to provide a tracer mechanism stylus which will anticipate the inside corners of a pattern but will operate in the normal manner along the other portions of the pattern.

A still further object is to provide an improved tracer mechanism stylus that is of simple but sturdy construction and efficient in operation.

According to this invention the improved tracer mechanism of the present invention comprises generally a circular pattern contacting member or tracer wheel adapted to engage the pattern and traverse its surface for the purpose of being deflected by the profile of the pattern. Such deflections of the tracer wheel in response to the contour of the pattern indicate the necessity of an adjustment of the position of the tracer wheel and cutter with respect to the pattern and workpiece respectively, to conform to the contour of the pattern, and produce control signals for controlling the operation of the machine accordingly. An anticipator ring of greater diameter than the diameter of the tracer wheel is disposed about the periphery of the tracer wheel and is engaged therewith by means of peripheral flanges to retain it in the plane of the tracer wheel, although the ring is free to move relative to the tracer wheel about its periphery in a direction normal to their axes. With this arrangement, the outer diameters of the tracer wheel and ring are both tangent to the pattern when traversing its surface except when negotiating an inside corner where the departure of the surface of the pattern is less than 180° from the preceding contiguous surface. At such corners, the periphery of the ring will contact the departing surface of the pattern before the tracer wheel will by reason of its greater diameter. Upon its initial contact with the departing surface the ring will be tangent to both surfaces of the pattern and will pause in this position for an instant while the tracer wheel is deflected by the inner diameter of the ring to produce the necessary control signal so that the tracer wheel actually traverses the inner radius of the ring instead of the pattern at inside corners. Thus, the inner diameter of the ring presents a smooth radius which replaces the abrupt corner of the pattern and constitutes the path of travel of the tracer wheel at inside corners. Therefore, the signal for movement of the tracer wheel in the direction of the departing surface of the pattern is established a moment before the tracer wheel actually arrives at the departing surface of the pattern to anticipate the surface and undercutting of the workpiece is thereby avoided. The extent of such anticipation is a function of the difference between the exterior radius of the ring and the radius of the tracer wheel.

The foregoing and other objects of this invention which will become more fully apparent from the following detailed description may be achieved by the particular embodiment depicted in and described in connection with the accompanying drawings, in which:

Figure 1 is a view in front elevation of a reproducing machine incorporating the improved tracer mechanism of the present invention;

Fig. 2 is an enlarged fragmentary view partly in vertical section and partly in front elevation to illustrate the tracer mechanism shown assembled to the machine in Fig. 1;

Fig. 3 is a view partly in side elevation and partly in vertical section taken along the plane represented by the line 3—3 in Fig. 2, with portions broken away to illustrate the construction of the tracer wheel and its cooperating ring; and, Figs. 4 to 8 inclusive are diagrammatic views illustrating the relative positions of the tracer wheel and anticipator ring as they progress along a pattern when negotiating an inside corner.

Reference is now made more particularly to the drawings and specifically to Fig. 1 thereof illustrating a machine tool especially adapted to reproduce a pattern in a workpiece and incorporating the improved tracing mechanism of the present invention. It comprises generally a base 10 with a fixed table 11 disposed on its upper surface and extending along its length. The base 10 supports a movable gantry, generally identified by the reference numeral 12, and which comprises a pair of upstanding columns 13 and 14 arranged in parallel spaced relationship. The columns 13 and 14 are connected at their top ends by a cap 15 while their opposite ends are provided with way surfaces 16 and 17 respectively for engagement with complementary ways 18 and 19 formed on the top surface of the base 10. The ways 18 and 19 extend along the entire length of the base 10, parallel to the table 11, with one way being located on each side of the table 11. The ways 18 and 19 therefore, serve to slidably support the gantry 12 for horizontal movement along the length of the base 10.

The columns 13 and 14 are provided with longitudinal way surfaces 22 and 23 respectively which extend vertically along one face of each of the columns in position to cooperate with complementary ways (not shown) disposed on the back surface of a rail 25 to slidably support the rail for vertical movement relative to the table 11. A spindle head 26 is mounted for movement along the underside of the rail 25 and is operable to effect power rotation of a cutter 27 which is keyed to an arbor 28 that is connected to be driven by the spindle head 26 in the usual manner. The arbor 28 is journalled in a pair of arbor supports 29 that depend from the rail 25 to rigidly support the arbor 28 and its associated cutter 27.

It is apparent therefore, that the cutter 27 may be raised or lowered relative to a workpiece 30 attached to the table 11 by actuating the rail 25 in its path of travel. Horizontal movement of the cutter 27 along the length of the table 11 may be effected by actuating the gantry 12 in its path of travel along the base 10 so that the cutter 27 is movable in two mutually transverse directions. The spindle head 26 may also be actuated for movement in its path of travel for moving the cutter 27 across the width of the table 11 and such movement is normally performed in increments approximating the width of the cutter 27 with an increment of movement being accomplished after each stroke of the cutter 27 along the length of the workpiece 30 so that the entire surface of the workpiece is operated upon by the cutter.

The power operation of the rail 25 in its vertical path of travel may be controlled by a control circuit (not shown) which is actuated by the operation of a tracer mechanism generally identified by the reference numeral 35. The tracer mechanism 35 is mounted for movement with the rail 25 and includes a pattern contacting tracer wheel or stylus generally identified by the reference numeral 36. The tracer wheel 36 is rotatably supported by a bracket 37 in position to engage a pattern 38 fixed on the top surface of a pattern support 34 which is disposed in juxtaposition with the base 10 and extends along its length. The pattern contacting tracer wheel 36 is moved along the length of the pattern 38 with the movement of the cutter 27 along the length of the workpiece 30 by movement of the gantry 12 in its path of travel and the tracer wheel 36 is deflected with respect to the rail 25 by the contour of the pattern 38 as it traverses its surface. Such deflections of the tracer wheel 36 produce control signals for actuating the control circuit to regulate the rise and fall of the rail 25 and its associated cutter 27 in accordance with the contour of the pattern so that the latter is reproduced in the workpiece 30. If necessary, the tracer mechanism 35 may be connected to move with the spindle head 26 along the length of the rail 25 so that it moves with the cutter 27 in increments across the width of the pattern 38 after each stroke along its length in order to traverse the entire surface of the pattern.

The tracer wheel 36 is rotatably supported by the bracket 37, and to this end, is mounted on a reduced threaded end portion 39 of a stub shaft 40 which is journalled in suitable antifriction bearings (not shown) that are carried by the bracket 37 to render the tracer wheel 36 freely rotatable. The tracer wheel 36 is retained on the reduced end portion 39 by a knurled nut 31 which holds the wheel tightly against the end of the enlarged portion of the stub shaft 40. The wheel 36 is provided with a peripheral groove 43 which serves to retain an anticipator ring 45 for reasons to be subsequently described. The groove 43 may be formed in a variety of ways, a convenient method being illustrated in the drawings in which the wheel 36 comprises a disk 46 having a circular plate 47 of greater diameter concentrically secured to one face and an identical circular plate 48 concentrically secured to the opposite face to form the annular groove 43. The circular plates 47 and 48 are secured to the disk 46 by bolts 49 which pass through both plates and the disk with their extending threaded ends engaged by suitable nuts 50.

The diameter of the plates 47 and 48 establishes the diameter of the tracer wheel 36, and it is preferable that this diameter conform to the diameter of the cutter 27 so that the axis of the tracer wheel 36 is the same distance from the pattern 38 that the axis of the cutter 27 is from the finished surface of the workpiece 30. It has been a common practice in the art to provide an oversize stylus having a diameter greater than the diameter of the cutter for the purpose of anticipating the contour of the pattern. With this arrangement the relative position of the tracer wheel is adjusted with respect to the cutter to compensate for the differences in diameters. The oversize tracer wheel will anticipate inside corners of a pattern since it will contact a departing surface of the pattern an instant before the cutter arrives at the corresponding point on the workpiece. The tracer mechanism transmits the signal to the control system upon arriving at such change in the contour of the pattern and during the time that it takes for the control system to react to the signal to guide the cutter accordingly, the cutter is traveling along the workpiece. When the direction of movement of the cutter is changed, it is at the identical point that the tracer produced the signal, and the accuracy of the reproduction is thereby improved since overtravel of the cutter at inside corners is avoided. Such overtravel can be serious inas much as it may inflict damage upon the workpiece and possibly upon the cutter. At an outside corner, any overtravel will only cause a small amount of additional material to remain upon the workpiece, and this excess material may be later removed by filing or other material removing process.

With the improved anticipator ring 45 of the present invention the desired anticipation of the contour of the pattern at inside corners is obtained without the necessity of an oversize tracer wheel. The axis of the tracer wheel may therefore be maintained at the same distance from the pattern that the axis of the cutter is from the finished surface of the workpiece, via the control action and the axis of the tracer wheel is retained in alignment with the axis of the cutter except when it is deflected by the contour of the pattern to produce an error signal to indicate the requirement of an adjustment to accommodate the contour of the pattern so that the amount of anticipation may be varied without requiring the adjustment of the tracer wheel relative to the cutter. To this end, the anticipator ring 45 is of a greater diameter than the tracer wheel by an amount dependent upon the amount of anticipation that is required. Its inner diameter is also greater than the diameter of the tracer wheel 36, and the cross sectional dimensions of its body are small enough to fit within the groove 43 of the tracer wheel 36 without binding therein so that the anticipator ring 45 may move relative to the tracer wheel 36 in the plane of the tracer wheel. The circular plates 47 and 48 are preferably fabricated of a yieldable material in order to exert a yieldable pressure upon the edges of the anticipator ring 45 to establish a frictional contact therewith while permitting it to slide in the groove 43 relative to the tracer wheel 36 but in the same plane. The radial depth of the body of the ring 45 conforms to the depth of the groove 43 so that when a portion of the body of the ring 45 is placed within the groove 43, and the tracer wheel 36 is moved into contact with the surface of the pattern, both the tracer wheel 36 and the anticipator ring 45 are tangent to the surface of the pattern as clearly shown in Fig. 3.

Although the extremities of the tracer wheel 36 and the anticipator ring 45 coincide at the point of contact with the pattern 38, the anticipator ring 45 will extend outwardly of the tracer wheel 36 at other areas because of its greater diameter and therefore precedes the tracer wheel 36 in the path of travel. This fact is taken advantage of in the present invention to effect the desired anticipation of the contour of the pattern inasmuch as the anticipator ring 45 will therefore contact the departing surface of the pattern prior to the time that the periphery of the tracer wheel reaches the same surface.

As the anticipator ring 45 contacts the departing surface of the pattern, it is tangent to both the departing surface and the preceding surface of the pattern at the same time, and remains in this position for an instant to present a smooth radius which the tracer wheel traverses as it negotiates the corner, replacing the abrupt corner of the pattern itself. As the tracer wheel initiates its movement along the radius of the anticipator ring 45 it produces a signal for upward movement of the rail 25 and is thereby caused to move out of contact with the pattern surface and moves along the radius of the anticipator ring 45. As the tracer wheel 36 travels along the radius of the anticipator ring 45 the latter remains in contact with both surfaces of the pattern until the tracer wheel arrives into contact with the departing surface of the pattern. When the tracer wheel 36 and the anticipator ring 45 are thus in common tangency with the departing surface of the pattern, the tracer wheel moves the anticipator ring 45 out of tangency with the preceding surface of the pattern, and the two members continue to traverse the surface of the pattern while retaining common tangency with it until another inside corner is encountered. With this arrangement the cutter follows an arcuate path when the pattern calls for an abrupt corner but this does not adversely affect the reproduction inasmuch as an abrupt corner of a pattern cannot be reproduced in the workpiece automatically anyway because of the radius of the cutter.

In the illustrated embodiment, the tracer wheel 36 is provided with flanges to form the annular groove 43 but it is to be understood that other structures may be employed to perform the required function of retaining the anticipator ring 45 in the plane of the tracer wheel 36 about its periphery while permitting the anticipator ring 45 to move relative to the tracer wheel 36 in this plane. Thus, for example, the anticipator ring 45 could be provided with annular inwardly extending flanges which would straddle the sides of the tracer wheel 36.

The coordination of the tracer wheel 36 and anticipator ring 45 in negotiating an inside corner of a pattern to prevent overtravel of the cutter along the workpiece is clearly illustrated in Figs. 4 to 8 inclusive where the several relative positions of the tracer wheel 36 and anticipator ring 45 are shown as an inside corner of the pattern is negotiated. In Fig. 4 the tracer wheel 36 and anticipator ring 45 are illustrated in common tangency with a straight surface 55 of the pattern and proceeding to the right toward a departing surface 56.

As clearly shown in Fig. 5, initial contact with the departing surface 56 is made by the anticipator ring 45 prior to the tracer wheel 36 making such contact. The anticipator ring 45 is then tangent to both surfaces 55 and 56 simultaneously, and remains in this position for a moment while the tracer wheel 36 negotiates the corner along the radius of the ring 45. It will be noted from the view in Fig. 5 that when the anticipator ring 45 first contacts the departing surface 56, the tracer wheel 36 is tangent to the preceding surface 55 but is a slight distance away from the departing surface 56.

The tracer wheel 36 then begins to negotiate the corner of the pattern, traveling along the radius of the anticipator ring 45 and not along the surface of the pattern. The radius of the anticipator ring replaces the abrupt corner of the pattern as a guide for the tracer wheel 36 and causes a deflection of the tracer wheel 36 to signal for an adjustment of the control circuit to produce the vertical component of the motion, in an upward direction, in advance of the time that it would produce this signal if the anticipator ring 45 were not present. The upward movement of the tracer wheel 36 and the cooperating cutter 27, is effected gradually to produce the motion of the tracer wheel 36 along the radius of the anticipator ring 45, and the tracer wheel 36 therefore moves out of tangency with the surface 55 and is guided along the corner by the ring 45 alone.

In Fig. 6 the tracer wheel 36 is shown in position approximately midway along the radius of the anticipator ring 45, having moved out of tangency with the surface 55 and approaching tangency with the departing surface 56. The tracer wheel 36 continues in this manner along the radius of the anticipator ring 45 while the latter remains in tangency with both surfaces 55 and 56. It progresses along the radius until it moves into tangency with the departing surface 56 as illustrated in Fig. 7 and then moves the anticipator ring 45 with it, out of tangency with the surface 55, and along the departing surface 56 with both members attaining common tangency with the departing surface 56 as clearly illustrated in Fig. 8.

It is therefore apparent that the presence of the anticipator ring 45 causes the tracer wheel 36 to signal for the vertical component of movement at inside corners prior to the time that it would produce such signal if the anticipator ring 45 were omitted. The ring therefore serves to present a gradual arcuate incline which establishes the path of travel of the tracer wheel 36 at inside corners, and when the tracer wheel actually reaches the departing surface, the control circuit has adjusted the machine to fully establish the upward movement of the tracer wheel 36 and cutter 27 along the surface 56. If the anticipator ring 45 were omitted, in the above described example, there would be no signal for vertical movement until the tracer wheel 36 contacted the departing surface 56. During the time that the signal were being transmitted and the control circuit reacted to such signal to change the path of travel of the tracer wheel and cutter, the cutter would be moving along the workpiece and travel beyond the surface 56 to cause damage to the workpiece which could not be conveniently remedied. The anticipator ring 45 therefore, avoids such overtravel and the consequent damage, without the necessity of an oversize tracer wheel.

The amount of anticipation required depends upon a number of variable operating conditions and will therefore vary from operation to operation. One of the advantages of the anticipator ring 45 is that it may be readily replaced by another ring of different diameter with a minimum of inconvenience to vary the amount of anticipation in accordance with the particular conditions. To replace the anticipator ring 45 it is only necessary to move the rail 25 upwardly to raise the tracer wheel 36 out of contact with the pattern 38. The anticipator ring 45 can then be simply lifted away and replaced with a new one of different diameter. Upon returning the rail to its original position, the new anticipator ring will be secured in operating position about the tracer wheel 36 by the groove 43, and there is no need for adjusting the position of the tracer wheel 36 relative to the cutter 27 as would be required of the diameter of the tracer wheel 36 were changed.

The operation of the anticipator ring 45 has been described in connection with a tracer mechanism adapted for controlling the rise and fall of a cutter but it is to be understood that it can also be employed with a stylus that is arranged to traverse the periphery of a pattern for 360° tracer operation. The anticipator ring will cooperate with such stylus about the periphery of the pattern in the same manner as described above for rise and fall operation and will produce the same results.

From the foregoing detailed description of the illustrative embodiment set forth herein to exemplify the present invention, it will be apparent that there has been provided an improved tracer mechanism stylus especially adapted to anticipate the departing surfaces of a pattern at inside corners to avoid overtravel of the cutter relative to the workpiece and which can be readily adjusted to vary the amount of anticipation without adjusting the position of the stylus relative to its cooperating cutter.

Although the exemplary embodiment of the invention has been described in considerable detail in order to fully disclose a practical apparatus incorporating the invention, it is to be understood that the particular structure shown and described is illustrative only, and that the various characteristics of the invention may be incorporated in other structural forms without departing from the spirit and scope of the inventtion as defined in the subjoined claims.

The principles of this invention having now been fully explained in connection with the foregoing description, I hereby claim as my invention:

1. In a tracer mechanism for producing control signals in response to the contour of a pattern; a tracer wheel supported in position to engage the pattern and to be deflected by the contour of the pattern to produce the control signals; an anticipator ring of greater diameter than the tracer wheel supported about the periphery of the tracer wheel; and retainer means connected to retain the anticipator ring in the plane of the tracer wheel while permitting it to move in said plane relative to the tracer wheel; whereby said anticipator ring contacts the departing surface of the pattern at inside corners before the tracer wheel arrives at the surface, to anticipate the contour of the pattern and thereby avoid overtravel of the cutter relative to the workpiece.

2. In a tracer mechanism for producing control signals in response to the contour of a pattern; a tracer wheel having a peripheral groove and supported in position to engage the pattern and to be deflected by the contour of the pattern to produce the control signals; and an anticipator ring of greater outer diameter than the tracer wheel and an inner diameter greater than the diameter of the base of said groove, the cross sectional dimensions of said anticipator ring being sufficiently small to be received in said groove; whereby said tracer wheel and said anticipator ring may be placed in common tangency with the surface of a pattern with a portion of the anticipator ring at the point of tangency being disposed in said groove to retain it in the plane of the tracer wheel without interfering with its movement relative to the tracer wheel in the plane of the tracer wheel.

3. In a tracer mechanism for producing control signals in response to the contour of a pattern; a tracer wheel supported in position to engage the pattern and to be deflected by the contour of the pattern to produce the control signals; an anticipator ring of greater diameter than the tracer wheel supported about the periphery of the tracer wheel; and a plurality of flanges connected to retain said anticipator ring in the plane of the tracer wheel about its periphery without interfering with its movement in said plane relative to the tracer wheel about the periphery of the tracer wheel; whereby said tracer wheel and said anticipator ring may be placed in common tangency with the surface of a pattern so that the anticipator ring will contact the departing surface of the pattern at inside corners before the tracer wheel arrives at the surface to anticipate the contour of the pattern and initiate a control signal before the tracer wheel arrives at the departing surface to thereby avoid overtravel of the cutter relative to the workpiece.

4. In a tracer mechanism for producing control signals in response to the contour of a pattern; a tracer wheel supported in position to engage the pattern and to be deflected by the contour of the pattern to produce control signals; and an anticipator ring of greater diameter than the tracer wheel supported about the periphery of the tracer wheel for movement relative thereto in the plane of the tracer wheel; whereby said anticipator ring will contact the departing surface of the pattern at inside corners before the tracer wheel arrives at the surface and present its inner radius at the corner to replace the abrupt corner of the pattern to establish the path of travel of the tracer wheel and thereby initiate the control signal before the tracer wheel arrives at the departing surface to avoid overtravel of the cutter relative to the workpiece.

5. In a tracer mechanism for producing control signals in response to the contour of a pattern; a stylus supported in position to engage the pattern and to be deflected by the contour of the pattern to produce control signals; and an anticipator ring of greater diameter than the pattern contacting portion of the stylus supported for movement in the plane of movement of the pattern contacting portion of the stylus and about its periphery so that it contacts the departing surface of the pattern at inside corners before the stylus arrives at the surface and presents its inner radius at the corner to replace the abrupt corner of the pattern and establish the path of travel of the stylus at the corner to initiate the control signal before the stylus arrives at the departing surface and thereby avoid overtravel of the cutter relative to the workpiece.

6. In a tracer mechanism for producing control signals in response to the contour of a pattern; a stylus supported in position to engage the pattern and to be deflected by the contour of the pattern to produce control signals; and an annular anticipator element having an inner diameter greater than the diameter of the pattern contacting portion of the stylus and supported for movement in the plane of movement of the pattern contacting portion of the stylus and about its periphery so that it contacts the departing surface of the pattern at inside corners before the stylus arrives at the surface and presents its inner radius at the corner to replace the sharp corner of the pattern and establish the path of travel of the stylus at the corner to initiate the control signal before the stylus arrives at the departing surface and thereby avoid overtravel of the cutter relative to the workpiece.

References Cited in the file of this patent

UNITED STATES PATENTS

| 2,557,876 | Klema | June 19, 1951 |
| 2,752,827 | Ernst | July 3, 1956 |